(12) United States Patent
Abe et al.

(10) Patent No.: US 8,796,994 B2
(45) Date of Patent: Aug. 5, 2014

(54) CONTROL APPARATUS FOR SECONDARY BATTERY AND CONTROL METHOD FOR SECONDARY BATTERY

(75) Inventors: Hiroyuki Abe, Anjo (JP); Tetsuya Hatta, Kuwana (JP)

(73) Assignee: NGK Insulators, Ltd., Nagoya (JP)

( * ) Notice: Subject to any disclaimer, the term of this patent is extended or adjusted under 35 U.S.C. 154(b) by 269 days.

(21) Appl. No.: 13/462,207

(22) Filed: May 2, 2012

(65) Prior Publication Data

US 2012/0217933 A1 Aug. 30, 2012

Related U.S. Application Data

(63) Continuation of application No. PCT/JP2010/068919, filed on Oct. 26, 2010.

(30) Foreign Application Priority Data

Dec. 15, 2009 (JP) .................................. 2009-284091

(51) Int. Cl.
*H02J 7/00* (2006.01)

(52) U.S. Cl.
USPC .......................... 320/128; 320/126; 320/134

(58) Field of Classification Search
None
See application file for complete search history.

(56) References Cited

U.S. PATENT DOCUMENTS

| 5,687,387 | A | * | 11/1997 | Endejan et al. ................ 710/2 |
| 5,861,730 | A | | 1/1999 | Lee |
| 7,463,949 | B2 | * | 12/2008 | Tani et al. .................... 700/286 |
| 2001/0005126 | A1 | * | 6/2001 | Ichihara et al. ............... 320/149 |
| 2008/0224541 | A1 | | 9/2008 | Fukuhara |
| 2009/0313034 | A1 | * | 12/2009 | Ferro et al. ........................ 705/1 |
| 2010/0028030 | A1 | * | 2/2010 | Maekawa ....................... 399/43 |
| 2010/0156352 | A1 | * | 6/2010 | Muta et al. .................... 320/134 |

FOREIGN PATENT DOCUMENTS

| CN | 1179640 A | 4/1998 |
| JP | 57-116550 A1 | 7/1982 |
| JP | 08-033240 A1 | 2/1996 |
| JP | 2004-111123 A1 | 4/2004 |
| JP | 2008-236821 A1 | 10/2008 |

OTHER PUBLICATIONS

International Search Report dated Jan. 25, 2011.

* cited by examiner

*Primary Examiner* — Arun Williams
(74) *Attorney, Agent, or Firm* — Burr & Brown, PLLC

(57) ABSTRACT

Provided are a control apparatus for a secondary battery and a control method for a secondary battery, which suppress decreases in released power and absorbed power. When a power storage device is requested to release power, a limit for power supply to a power consuming body is set relatively higher, and when the power storage device is requested to absorb power, the limit for power supply to the power consuming body is set relatively lower. When the power storage device is requested to release power, a command value PD for released power is calculated by adding supplied power PS to a requested value PE for released power. When the power storage device is requested to absorb power, a command value PC for charged power is calculated by subtracting the supplied power PS from a requested value PA for absorbed power.

14 Claims, 10 Drawing Sheets

F I G. 1
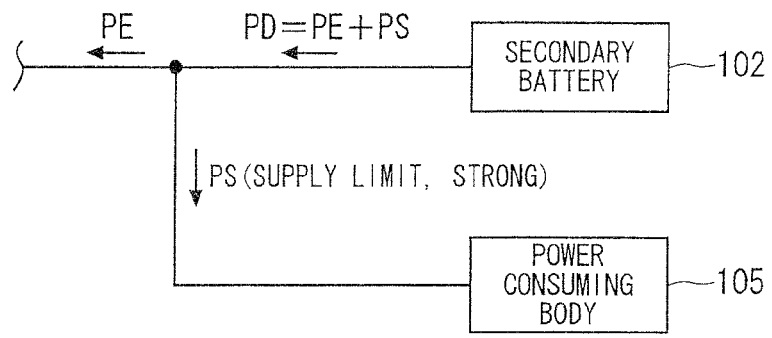
F I G. 2
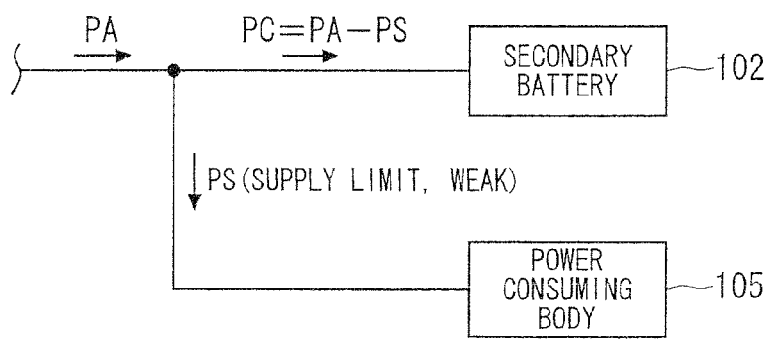

F I G . 5
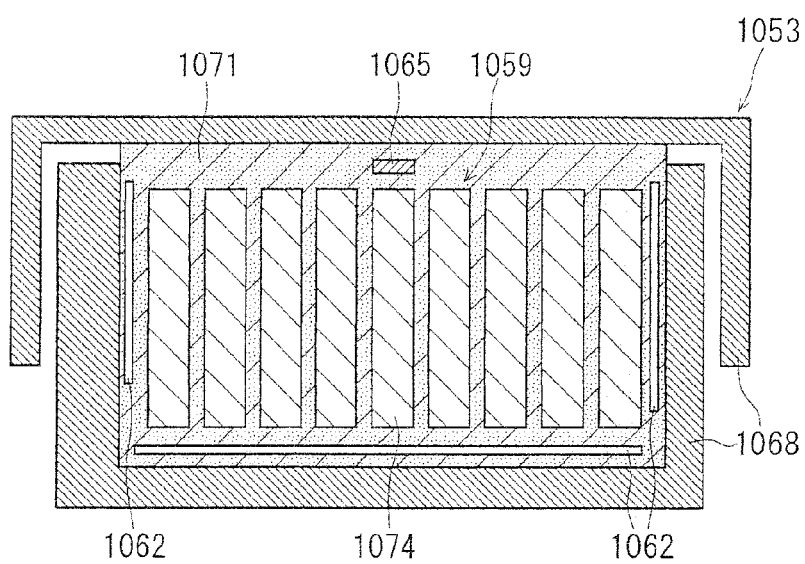

F I G. 6
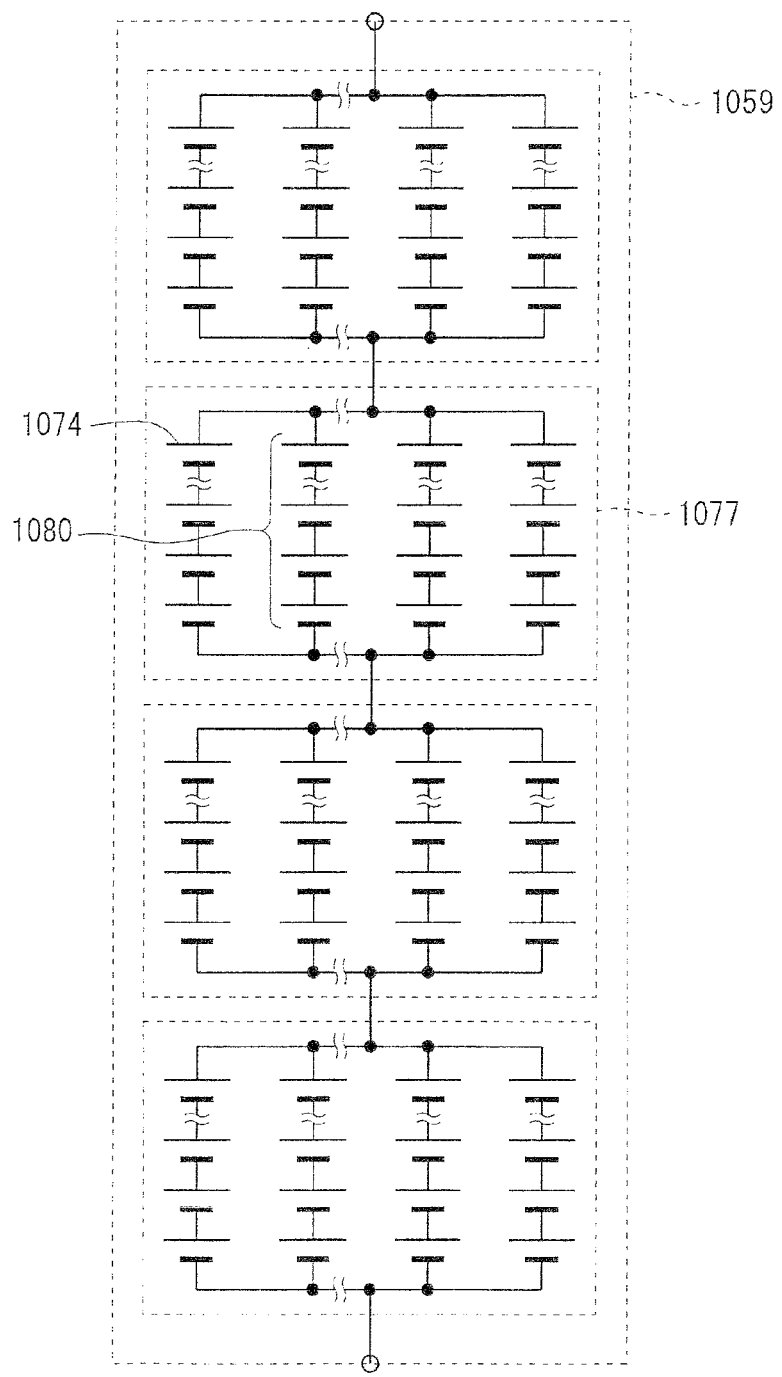

F I G . 8
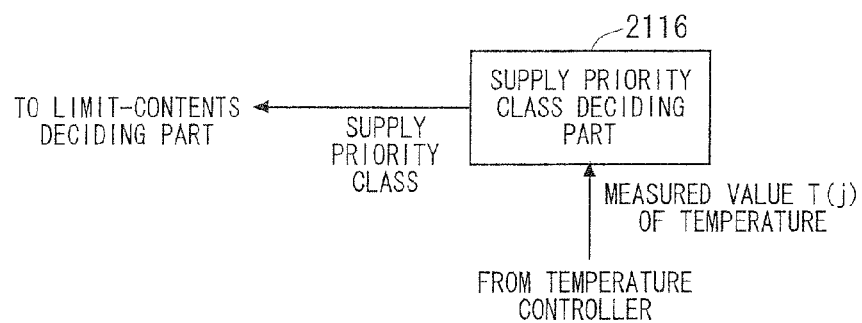

CONTROL APPARATUS FOR SECONDARY BATTERY AND CONTROL METHOD FOR SECONDARY BATTERY

TECHNICAL FIELD

The present invention relates to a control apparatus for a secondary battery and a control method for a secondary battery.

BACKGROUND ART

A sodium-sulfur battery (hereinafter referred to as "NaS battery") is a battery that operates at a high temperature. Therefore, the NaS battery is used with a heater that heats the NaS battery, and is operated in the state of being kept at a high temperature.

Patent Document 1 relates to control of a heater that heats the NaS battery. Patent Document 1 refers to a problem with a conventional technique, which is a decrease in released power due to power supply to the heater (paragraph 0007). Further, in order to solve this problem with the conventional technique, Patent Document 1 refers to solving means such as decreasing a set temperature of the heater during a period after completion of charge until start of discharge (paragraph 0015).

PRIOR ART DOCUMENT

Patent Document

Patent Document 1: Japanese Patent Application Laid-Open No. 2004-111123.

SUMMARY OF THE INVENTION

Problems to be Solved by the Invention

However, the technique of Patent Document 1 is intended for a case where a switch cycle between charge and discharge is relatively long, and is thus not effective when the switch cycle between charge and discharge is relatively short. For this reason, even when the technique of Patent Document 1 is applied to the power storage device provided with the NaS battery, power supply to the heater may be controlled in disregard of a request for power release/absorption, and desired released power and absorbed power may thus be hard to realize. For example, when there is a request for releasing power that agrees with maximal released power of the NaS battery, power may be supplied to the heater and the released power may become lower than the maximal released power of the NaS battery. Further, an upper limit for the absorbed power cannot be a sum of the maximal charged power of the NaS battery and rated consumption power of the heater, but has to be the maximal charged power of the NaS battery.

The present invention has been made in view for solving this problem, and an object thereof is to provide a control apparatus for a secondary battery and a control method for a secondary battery which facilitate realization of desired released power and absorbed power.

Means for Solving the Problem

Means for solving the problem will be described below.

According to a first aspect of the present invention, a control apparatus for a secondary battery includes: a request acquiring part that acquires a request for power release/absorption and a requested value for released/absorbed power; a discharged/charged power calculator that calculates discharged/charged power of the secondary battery; a command value outputting part that outputs a calculated value of the discharged/charged power calculated by the discharged/charged power calculator as a command value for discharged/charged power; a bidirectional converter that controls discharge/charge of the secondary battery such that the discharged/charged power is the command value outputted by the command value outputting part; a power consuming body that consumes power; a limit-contents deciding part that decides contents of a limit for power supply to the power consuming body; and a supply controller that controls power supply to the power consuming body in accordance with the decision made by the limit-contents deciding part, wherein the limit-contents deciding part sets the limit for power supply relatively higher when a request for power release is acquired by the request acquiring part, and sets the limit for power supply relatively lower when a request for power absorption is acquired by the request acquiring part, and the discharged/charged power calculator adds the power supplied to the power consuming body to the requested value for released power acquired by the request acquiring part, to calculate discharged power, and subtracts the power supplied to the power consuming body from the requested value for absorbed power acquired by the request acquiring part, to calculate charged power.

According to a second aspect of the present invention, a control apparatus for a secondary battery includes: a request acquiring part that acquires a request for power release/absorption and a requested value for released/absorbed power; a discharged/charged power calculator that calculates discharged/charged power of the secondary battery; a command value outputting part that outputs a calculated value of the discharged/charged power calculated by the discharged/charged power calculator as a command value for discharged/charged power; a bidirectional converter that controls discharge/charge of the secondary battery such that the discharged/charged power is the command value outputted by the command value outputting part; a power consuming body that consumes power; a limit-contents deciding part that decides contents of a limit for power supply to the power consuming body; and a supply controller that controls power supply to the power consuming body in accordance with the decision made by the limit-contents deciding part, wherein the limit-contents deciding part sets the limit for power supply relatively higher when a request for power release is acquired by the request acquiring part, and sets the limit for power supply relatively lower when a request for power absorption is acquired by the request acquiring part.

According to a third aspect of the present invention, in the control apparatus for a secondary battery of the first or second aspect, the power consuming body is a heater that heats the secondary battery, a temperature sensor that measures a temperature of the secondary battery is further provided in the control apparatus for a secondary battery, and the limit-contents deciding part permits power supply to the heater regardless of the request acquired by the request acquiring part when the measured value of the temperature measured by the temperature sensor is lower than a first lower limit, permits power supply to the heater upon acquirement of the request for power absorption by the request acquiring part and prohibits power supply to the heater upon acquirement of the request for power release by the request acquiring part when the measured value of the temperature measured by the temperature sensor is higher than the first lower limit and lower than a second lower limit.

According to a fourth aspect of the present invention, in the control apparatus for a secondary battery of the third aspect, the supply controller controls power supply to the heater such that the measured value of the temperature measured by the temperature sensor is a set value when power supply to the heater is permitted by the limit-contents deciding part.

According to a fifth aspect of the present invention, in the control apparatus for a secondary battery of the third or fourth aspect, a plurality of the temperature sensors and the heaters are provided, a priority deciding part that decides priority for power supply to each of the plurality of heaters is further provided in the control apparatus for a secondary battery, the priority deciding part increases priority for power supply to the heater with decrease in measured value of the temperature measured by the temperature sensor, and the limit-contents deciding part permits power supply in an order from the heater with higher priority for power supply to the heater with lower priority for power supply, the priority having been decided by the priority deciding part, such that overall supplied power, as a sum of power supplied to each of the plurality of heaters, is not higher than the requested value for absorbed power acquired by the request acquiring part.

According to a sixth aspect of the present invention, in the control apparatus for a secondary battery of any of the third to fifth aspects, the limit-contents deciding part repeatedly updates contents of a limit for power supply to the power consuming body at intervals, and a first lower limit and a second lower limit which are applied at the time of an increase in measured value of the temperature measured by the temperature sensor are displaced to higher values than a first lower limit and a second lower limit which are applied at the time of a decrease in measured value.

According to a seventh aspect of the present invention, in the control apparatus for a secondary battery of any of the third to sixth aspects, the limit-contents deciding part prohibits power supply to the heater regardless of the request acquired by the request acquiring part when the measured value of the temperature measured by the temperature sensor is higher than an upper limit.

According to an eighth aspect of the present invention, in the control apparatus for a secondary battery of the first or second aspect, the power consuming body is a heater that heats the secondary battery, a temperature sensor that measures a temperature of the secondary battery, and a predicted value calculator that calculates a predicted value of the temperature of the secondary battery from a history of the measured value of the temperature measured by the temperature sensor and a history of the supplied power to the power consuming body, are further provided in the control apparatus for a secondary battery, and the limit-contents deciding part permits power supply to the heater upon acquirement of the request for power absorption by the request acquiring part and prohibits power supply to the heater upon acquirement of the request for power release by the request acquiring part when the predicted value of the temperature calculated by the predicted value calculator is lower than a lower limit.

According to a ninth aspect of the present invention, in the control apparatus for a secondary battery of the eighth aspect, the supply controller controls power supply to the heater such that the measured value of the temperature measured by the temperature sensor is a set value when power supply to the heater is permitted by the limit-contents deciding part.

According to a tenth aspect of the present invention, in the control apparatus for a secondary battery of the eighth or ninth aspect, a plurality of the temperature sensors and the heaters are provided, a priority deciding part that decides priority for power supply to each of the plurality of heaters is further provided in the control apparatus for a secondary battery, the priority deciding part increases priority for power supply to the heater with decrease in measured value of the temperature measured by the temperature sensor, and the limit-contents deciding part permits power supply in an order from the heater with higher priority for power supply to the heater with lower priority for power supply, the priority having been decided by the priority deciding part, such that overall supplied power, as a sum of power supplied to each of the plurality of heaters, is not higher than the requested value for absorbed power acquired by the request acquiring part.

According to an eleventh aspect of the present invention, in the control apparatus for a secondary battery of any of the eighth to tenth aspects, the limit-contents deciding part repeatedly updates contents of a limit for power supply to the power consuming body at intervals, and a lower limit which is applied at the time of an increase in predicted value of the temperature calculated by the predicted value calculator is displaced to a higher value than a lower limit which is applied at the time of a decrease in predicted value.

According to a twelfth aspect of the present invention, in the control apparatus for a secondary battery of any of the eighth to eleventh aspects, the limit-contents deciding part prohibits power supply to the heater regardless of the request acquired by the request acquiring part when the predicted value of the temperature calculated by the predicted value calculator is higher than an upper limit.

According to a thirteenth aspect of the present invention, a control method for a secondary battery includes: (a) a step of acquiring a request for power release/absorption and a requested value for released/absorbed power; (b) a step of calculating discharged/charged power of the secondary battery; (c) a step of outputting a calculated value of the discharged/charged power calculated in the step (b) as a command value for discharged/charged power; (d) a step of controlling discharge/charge of the secondary battery such that the power is the command value outputted in the step (c); (e) a step of deciding contents of a limit for power supply to the power consuming body; and (f) a step of controlling power supply to the power consuming body in accordance with the decision made in the step (e), wherein the step (e) sets the limit for power supply relatively higher when a request for power release is acquired in the step (a), and sets the limit for power supply relatively lower when a request for power absorption is acquired in the step (a), and the step (b) adds the power supplied to the power consuming body to the requested value for released power acquired in the step (a), to calculate discharged power, and subtracts the power supplied to the power consuming body from the requested value for absorbed power acquired in the step (a), to calculate charged power.

According to a fourteenth aspect of the present invention, a control method for a secondary battery includes: (a) a step of acquiring a request for power release/absorption and a requested value for released/absorbed power; (b) a step of calculating discharged/charged power of the secondary battery; (c) a step of outputting a calculated value of the discharged/charged power calculated in the step (b) as a command value for discharged/charged power; (d) a step of controlling discharge/charge of the secondary battery such that the discharged/charged power is the command value outputted in the step (c); (e) a step of deciding contents of a limit for power supply to the power consuming body; and (f) a step of controlling power supply to the power consuming body in accordance with the decision made in the step (e), wherein the step (e) sets the limit for power supply relatively higher when a request for power release is acquired in the step (a), and sets the limit for power supply relatively lower when a request for power absorption is acquired in the step (a).

Effects of the Invention

According to the first and second aspects of the invention, the limit for power supply to the power consuming body is alleviated more when power absorption is requested than when power release is requested, whereby a decrease in released power due to power supply to the power consuming body is suppressed and a decrease in absorbed power due to non-supply of power to the power consuming body is suppressed, to facilitate realization of desired released power and absorbed power.

According to the third and eighth aspects of the invention, when the necessity for heating a secondary battery increases, heating of the secondary battery by the heater is permitted even when either power release or power absorption is requested. When the necessity for heating of the secondary battery slightly decreases, a limit for heating of the secondary battery is alleviated more when power absorption is requested than when power release is requested. Hence, in addition to suppression of the decrease in released power due to power supply to the power consuming body and suppression of the decrease in absorbed power due to non-supply of power to the power consuming body, the temperature of the secondary battery is properly held.

According to the fourth and ninth aspects of the invention, the temperature of the secondary battery comes close to the set value.

According to the fifth and tenth aspects of the invention, since the secondary battery with a lower temperature is preferentially heated, the temperature of the secondary battery is properly held.

According to the sixth and eleventh aspects of the invention, frequent changes in contents of the limit for power supply to the power consuming body are suppressed, thereby to suppress a defect caused by the frequent changes in contents of the limit for power supply to the power consuming body.

According to the seventh and twelfth aspects of the invention, the temperature of the secondary battery far exceeding the upper limit is suppressed.

According to the thirteenth and fourteenth aspects of the invention, the limit for power supply to the power consuming body is alleviated more when power absorption is requested than when power release is requested, whereby a decrease in released power due to power supply to the power consuming body is suppressed, and a decrease in absorbed power due to non-supply of power to the power consuming body is suppressed.

These and other objects, features, aspects, and advantages of the present invention will become apparent by the following detailed descriptions of the invention when considered along with the attached drawings.

BRIEF DESCRIPTION OF THE DRAWINGS

FIG. 1 is a diagram describing power supply to a power consuming body in the case of power release having been requested.

FIG. 2 is a diagram describing power supply to the power consuming body in the case of power absorption having been requested.

FIG. 5 is a sectional view of a battery module.

FIG. 6 is a circuit diagram of a cell assembly.

FIG. 8 is a block diagram describing a decision of priority for power supply to a heater in a second embodiment.

EMBODIMENT FOR CARRYING OUT THE INVENTION

Figure 3:
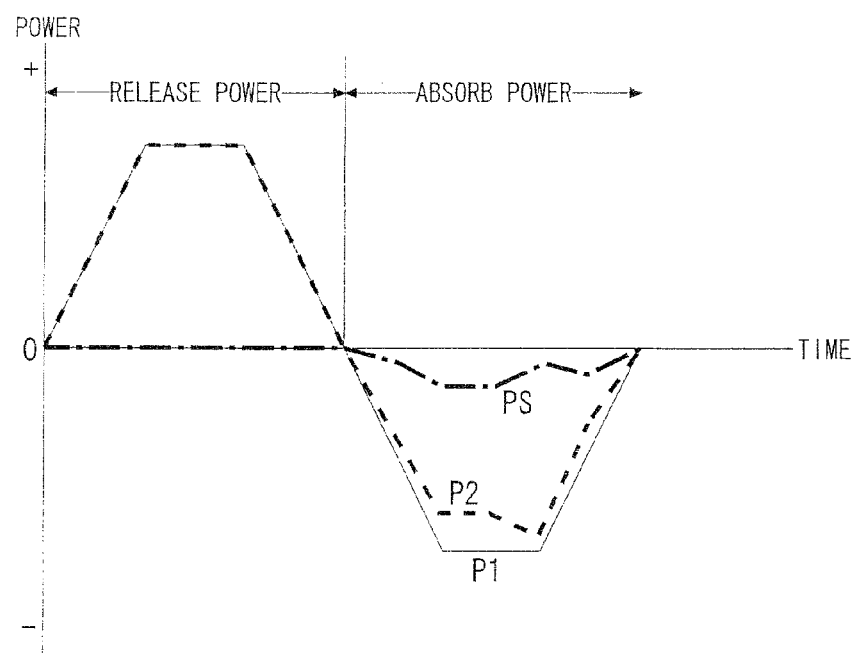
FIG. 3 is a diagram describing an effect of a limit for power supply to the power consuming body.

<Summary of Power Supply to Power Consuming Body 105>

FIGS. 1 and 2 are diagrams describing power supply to a power consuming body 105 in a power storage device provided with a secondary battery 102 and the power consuming body 105. FIG. 1 shows the relation among a requested value PE for released power of the power storage device, a supplied power PS to the power consuming body 105, and a command value PD for discharged power of the secondary battery 102 in the case of the power storage device having been requested for power release. FIG. 2 shows the relation among a requested value PA for absorbed power of the power storage device, a supplied power PS to the power consuming body 105, and a command value PC for charged power of the secondary battery 102 in the case of the power storage device having been requested for power absorption.

When the power storage device is requested to release power, as shown in FIG. 1, the command value PD for released power is calculated by adding the supplied power PS to the requested value PE for released power in accordance with Equation (1).

$$PD = PE + PS \tag{1}$$

When the power storage device is requested to absorb power, as shown in FIG. 2, the command value PC for charged power is calculated by subtracting the supplied power PS from the requested value PA for absorbed power in accordance with Equation (2).

$$PC = PA - PS \tag{2}$$

Using a requested value P1 (P1=PE=−PA) for released/absorbed power of the power storage device expressed according to a convention that released power is expressed as a positive value and absorbed power is expressed as a negative value, and a command value P2 (P2=PD=−PC) for discharged/charged power expressed according to a convention that discharged power is expressed as a positive value and charged power is expressed as a negative value, Equation (1) and Equation (2) are aggregated into Equation (3). These conventions will also be used in the following description.

$$P2 = P1 + PS \tag{3}$$

When the power storage device is requested to release power, the limit for power supply to the power consuming body 105 is set relatively higher as shown in FIG. 1, and when the power storage device is requested to absorb power, the limit for power supply to the power consuming body 105 is set relatively lower as shown in FIG. 2. Since the limit for power supply to the power consuming body 105 is thus alleviated more in the case of power absorption having been requested than in the case of power release having been requested, a decrease in released power PE due to power supply to the power consuming body 105 is suppressed and a decrease in absorbed power PA due to non-supply of power to the power consuming body 105 is suppressed, thereby to facilitate realization of desired released power PE and desired absorbed power PA.

A factor other than the request for power release and the request for power absorption may be reflected to the limit for power supply to the power consuming body 105.

The power consuming body 105 operates by consuming power. The power consuming body 105 as an object to be limited for power supply prevents a loss of a function of the power storage device even when power supply is temporarily limited. This allows an intermittent operation of the power consuming body 105 as the object to be limited for power supply.

Examples of the power consuming body 105 include a temperature adjustment mechanism that adjusts a temperature of the secondary battery 102, a temperature adjustment mechanism that adjusts a temperature of a constituent other than the secondary battery 102, and an electrolyte circulation mechanism that circulates an electrolyte of a redox flow battery. The temperature adjustment mechanism may be a heating device that heats an object or may be a cooling device that cools the object. Examples of the temperature adjustment mechanism include air conditioning facilities, a cooling fan, and a cooling mechanism. Examples of the electrolyte circulation mechanism include a pump.

Examples of enforcement in limit for power supply include prohibition of power supply and lowering of an upper limit for power supply, and examples of reduction in the limit for power supply is permission of power supply and an increase in upper limit for power supply.

The number of secondary batteries 102 and the number of power consuming bodies 105 are not limited to one, and may be more than one.

When the number of secondary batteries 102 is more than one, discharged/charged power may be distributed to each secondary battery 102 in any manner, but the distribution is desirably performed in accordance with an index including a factor that indicates a state of the secondary battery 102. Hence, the state of the secondary battery 102 is properly held. Examples of the factor include an SOC (state of charge), a DOD (depth of discharge), a temperature, and the number of times of discharge/charge.

When the number of power consuming bodies 105 is more than one, supplied power may be distributed to each power consuming body 105 in any manner, but the distribution is desirably performed in accordance with an index including a factor that indicates a state of an object on which the power consuming body 105 acts. When the power consuming body 105 is the temperature adjustment mechanism, examples of the index include a temperature of the object. When the power consuming body 105 is the electrolyte circulation mechanism that circulates an electrolyte of the redox flow battery, examples of the index include a concentration of an oxidant or a reductant which is contained in an electrolyte in a cell where a redox reaction occurs.

FIG. 3 is a diagram describing the foregoing effect of the limit for power supply to the power consuming body 105. FIG. 3 shows the relation among a requested value P1 for released/absorbed power, the supplied power PS to the power consuming body 105, and a command value P2 for discharged/charged power in the power storage device that prohibits power supply to the power consuming body 105 in the case of power release having been requested, and permits power supply to the power consuming body 105 in the case of power absorption having been requested. FIG. 3 shows time changes in requested value P1 for released/absorbed power, supplied power PS to the power consuming body 105 and command value P2 for discharged/charged power, with a horizontal axis taken as time and a vertical axis taken as power.

As shown in FIG. 3, during the time when power release is requested, the supplied power PS to the power consuming body 105 is 0, and the command value P2 for discharged/charged power (command value for discharged power) is made to agree with the requested value P1 for released/absorbed power (requested value for released power). On the other hand, during the time when power absorption is requested, the supplied power PS to the power consuming body 105 is not 0, and an absolute value |P2| of the command value for discharged/charged power (command value for charged power) is made smaller than an absolute value |P1| of the requested value for released/absorbed power (requested value for absorbed power) by an amount of the supplied power PS to the power consuming body 105.

1. First Embodiment

A first embodiment relates to a power storage device 1002.
(Summary of Power Storage Device 1002)
FIG. 4 is a block diagram of the power storage device 1002 in the first embodiment.

Figure 4:
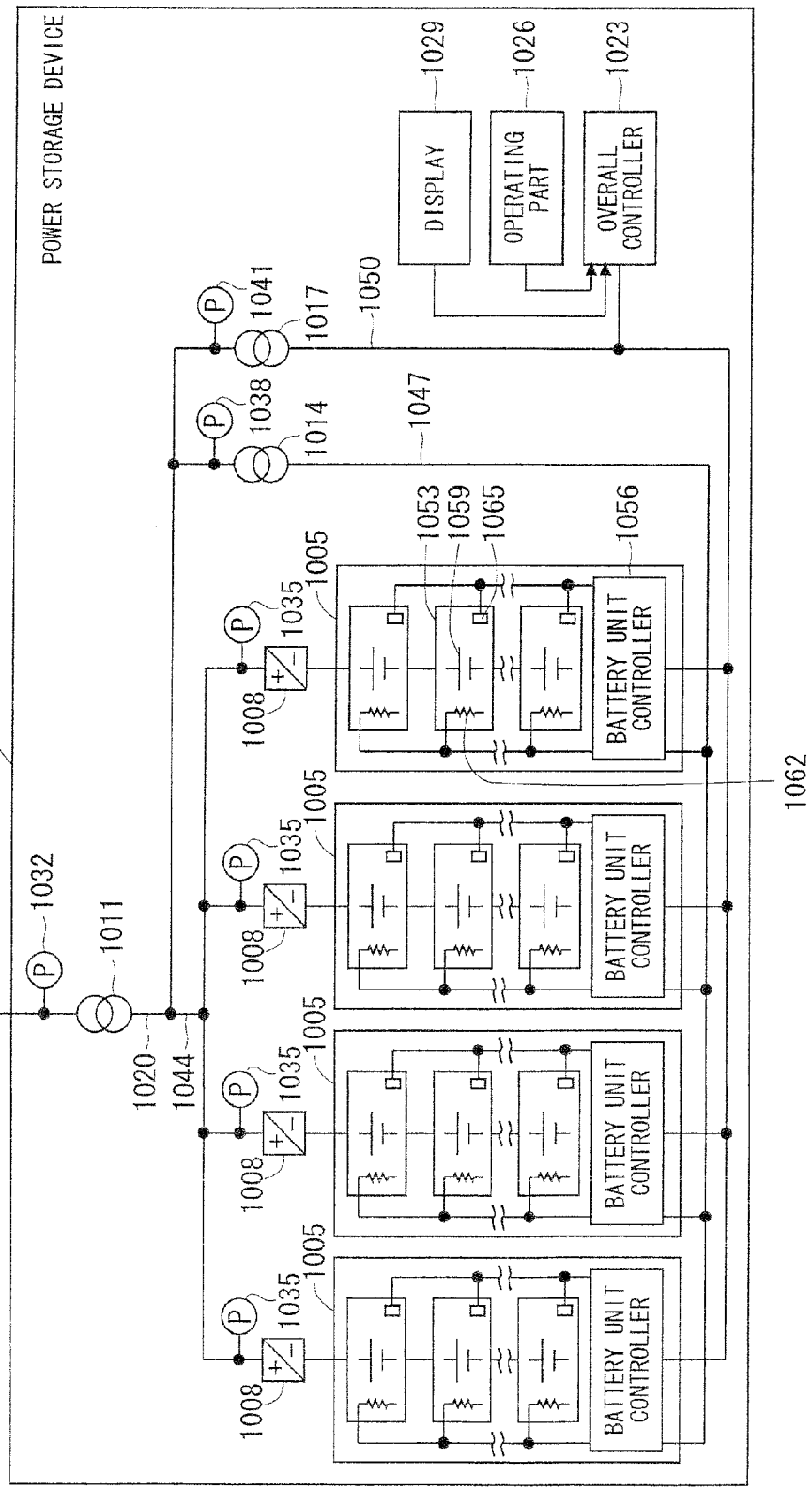
FIG. 4 is a block diagram of a power storage device in a first embodiment.

As shown in FIG. 4, the power storage device 1002 is provided with a battery unit 1005 that stores power, a bidirectional converter 1008 that converts power discharged from each battery unit 1005 from DC to AC and converts power to be charged to each battery unit 1005 from AC to DC, a transformer 1011 that boosts power to be released from the power storage device 1002 and depresses power to be absorbed to the power storage device 1002, a transformer 1014 that depresses power to be supplied to a heater 1062, a transformer 1017 that depresses power to be supplied to an overall controller 1023 and a battery unit controller 1056, a power transmission channel 1020 that transmits power, the overall controller 1023 that controls the power storage device 1002, an operating part 1026 that accepts an operation, and a display 1029 that displays information.

Further, the power storage device 1002 is provided with a wattmeter 1032 that measures released/absorbed power of the power storage device 1002, a wattmeter 1035 that measures discharged/charged power of each battery unit 1005, a wattmeter 1038 that measures overall supplied power (hereinafter referred to as "overall heater power") as a sum of supplied power to each heater 1062, and a wattmeter 1041 that measures overall supplied power (hereinafter referred to as "overall controlled power") as a sum of supplied power to the overall controller 1023 and the battery unit controller 1056.

A power transmission channel 1020 includes a discharged/charged power transmission channel 1044 that transmits power to be charged to the battery unit 1005 and power discharged from the battery unit 1005, a heater power transmission channel 1047 that transmits power to be supplied to the heater 1062, and a controlled power transmission channel 1050 that transmits power to be supplied to the overall controller 1023 and the battery unit controller 1056. The discharged/charged power transmission channel 1044, the heater power transmission channel 1047, and the controlled power transmission channel 1050 are separated, and the respective channels independently transmit power.

(Battery Unit 1005)

Each battery unit 1005 is independently discharged/charged. Although FIG. 4 shows four battery units 1005, the number of battery units 1005 is increased/decreased in accordance with a specification of the power storage device 1002.

As shown in FIG. 4, each battery unit 1005 is provided with a battery module 1053 that stores power, and the battery unit controller 1056 that controls the battery unit 1005. Each battery module 1053 houses a cell aggregate 1059, the heater 1062 that heats the cell aggregate 1059, and a temperature sensor 1065 that measures a temperature of the cell aggregate 1059.

The battery unit 1005 is provided with one or more battery modules 1053. The number of battery modules 1053 is increased/decreased in accordance with a specification of the battery unit 1005.

(Battery Module 1053)

FIG. 5 is a schematic view of the battery module 1053. FIG. 5 shows a cross-section of the battery module 1053.

As shown in FIG. 5, the battery module 1053 is provided with a covered heat-insulating container 1068 that holds a temperature of an accommodated matter, the cell aggregate 1059 that stores power, sand 1071 that shuts off the air, the heater 1062 that heats the cell aggregate 1059, and the temperature sensor 1065 that measures the temperature of the cell aggregate 1059. The cell aggregate 1059 is accommodated in the covered heat-insulating container 1068. The sand 1071 is accommodated in the covered heat-insulating container 1068, to fill spaces among cells 1074. The heater 1062 has a panel shape, and is fixed to the inner surface of the covered heat-insulating container 1068. The temperature sensor 1065 is buried in the sand 1071. The cell 1074 is typically a cell (unit cell) of the NaS battery, but may be a cell of a secondary battery of a different kind.

(Cell Aggregate 1059)

FIG. 6 is a circuit diagram of the cell aggregate 1059.

As shown in FIG. 6, the cell aggregate 1059 is a series-connected body formed by series-connection of blocks 1077, where the block 1077 is a parallel-connected body formed by parallel-connection of strings 1080, and the string 1080 is a series-connected body formed by series-connection of the cells 1074. The number of series-connection of the block 1077, the number of parallel-connection of the strings 1080, and the number of series-connection of the cells 1074 are increased/decreased in accordance with a specification of the battery module 1053. A connecting form of the cells 1074 in the cell aggregate 1059 is also changed in accordance with a specification of the battery module 1053.

(Bidirectional Converter 1008)

The bidirectional converter 1008 controls discharge/charge of each of the plurality of battery units 1005 such that discharged/charged power is a command value outputted by the later-mentioned command value outputting part 1107.

The bidirectional converter 1008 is also referred to as a "PCS (Power Conversion System)", "AC/DC converter" or the like. Alternate conversion between DC and AC in the bidirectional converter 1008 is performed by a PWM (Pulse Width Modulation) inverter or the like.

(Control System of Power Storage Device 1002)

Figure 7:
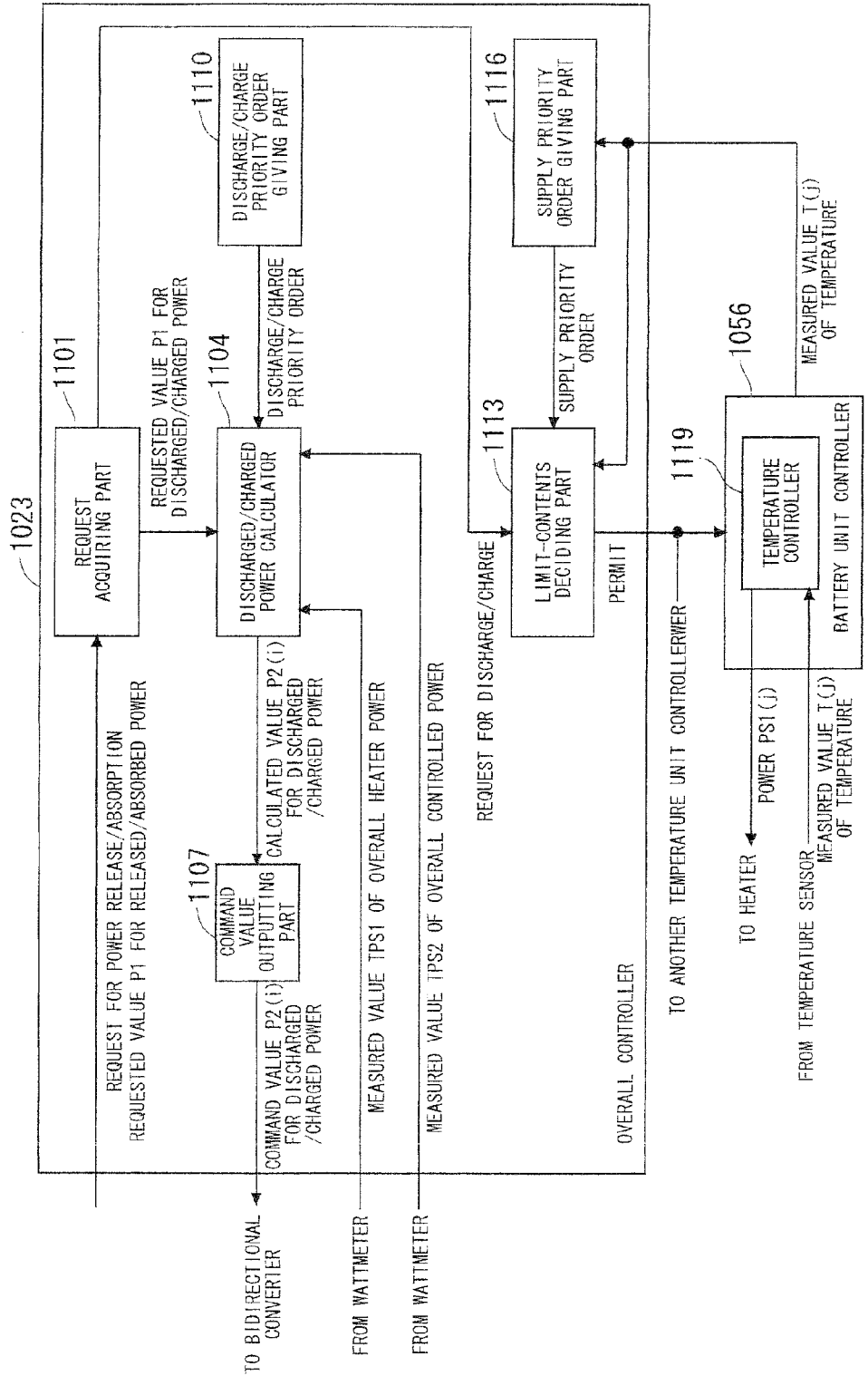
FIG. 7 is a block diagram of a control system of the power storage device in the first embodiment.

FIG. 7 is a block diagram of a control system of the power storage device 1002 in the first embodiment. Functions of the overall controller 1023 and the battery unit controller 1056 shown in FIG. 7 may be realized by a built-in computer, provided with a CPU and a memory, by executing a control program, or may be realized by hardware. Part or the whole of a function of the overall controller 1023 may be transferred to the battery unit controller 1056, or part or the whole of a function of the battery unit controller 1056 may be transferred to the overall controller 1023. Part or the whole of the functions of the overall controller 1023 and the battery unit controller 1056 may be executed by an operator of the power storage device 1002. Later-mentioned "calculation" includes not only calculation by means of an arithmetic expression, but also processing for deriving information in accordance with a rule such as conversion by means of a numerical table, calculation by means of an analog arithmetic circuit, or the like.

As shown in FIG. 7, the overall controller 1023 is provided with: a request acquiring part 1101 that acquires a request for power release/absorption and a requested value P1 for released/absorbed power, a discharged/charged power calculator 1104 that calculates discharged/charged power of each battery unit 1005, a command value outputting part 1107 that outputs a command value P2($i$) for discharged/charged power of each battery unit 1005, a discharge/charge priority order giving part 1110 that gives priority order for discharge/charge (hereinafter referred to as "discharge/charge priority order") to each battery unit 1005, a limit-contents deciding part 1113 that decides contents of a limit to power supply to the heater 1062, and a supply priority order giving part 1116 that gives priority order for power supply (hereinafter referred to as "supply priority order") to each heater 1062. Symbol $i$ included in the command value (calculated value) P2($i$) specifies the battery unit 1005.

The battery unit controller 1056 is provided with a temperature controller 1119 that controls the temperature of the cell aggregate 1059 (temperature of the inside of the battery module 1053).

(Power Consuming Body)

The heater 1062 is the power consuming body 105 that is allowed to temporarily control power supply, and serves as an object to be limited for power supply. The overall controller 1023 and the battery unit controller 1056 are the power consuming bodies 105 that are not allowed to temporarily control power supply, and do not serve as the objects to be limited for power supply. The power consuming body 105 serving as the object to be limited for power supply, other than the heater 1062, may receive power supply via the heater power transmission channel 1047. The power consuming body not serving as the object to be limited for power supply, other than the overall controller 1023 and the battery unit controller 1056, may receive power supply via the controlled power transmission channel 1050. Therefore, the heater power transmission channel 1047 more typically serves as a channel for power supply to the power consuming body 105 serving as the object to be limited for power supply. The controlled power transmission channel 1050 more typically serves as a channel for power supply to the power consuming body not serving as the object to be limited for power supply. It is allowed not to use part of the power consuming body, which is allowed to temporarily control power supply, as the object to be limited for power supply, but it is not allowed to use part of the power consuming body, which is not allowed to temporarily control power supply, as the object to be limited for power supply.

(Input Channel for Request for Power Release/Absorption and Requested Value for Released/Absorbed Power)

The request for power release/absorption and the requested value P1 for released/absorbed power may be inputted from the operating part 1026 or may be inputted from the outside via a communication circuit.

(Discharged/Charged Power Calculator 1104)

In accordance with Equation (4), the discharged/charged power calculator 1104 adds overall heater power TPS1 to the requested value P1 for discharged/charged power, and further adds overall control power TPS2, to obtain overall discharged/charged power TP2 as a sum of discharged/charged power of all the battery units 1005.

$$TP2 = P1 + TPS1 + TPS2 \qquad (4)$$

Although the overall heater power TPS1 is reflected to the overall discharged/charged power TP2 in Equation (4), the overall heater power TPS1 may not be reflected to the overall discharged/charged power TP2, depending on the application of the power storage device 1002. For example, in the case of using the power storage device 1002 for adjustment of power demand and supply of a micro grid, when power supply to the heater 1062 is suppressed upon request of the power storage device 1002 for power release due to excessive demand, and when power supply to the heater 1062 is promoted upon request of the power storage device 1002 for power absorption due to excessive supply, the overall heater power TPS1 contributes to adjusting power demand and supply even though the overall heater power TPS1 is not reflected to the overall discharged/charged power TP2.

Further, the discharged/charged power calculator 1104 distributes discharged/charged power in the order from the battery unit 1005 with higher discharge/charge priority order given by the discharge/charge priority order giving part 1110 to the battery unit 1005 with lower discharge/charge priority order given by the same.

(Command Value Outputting Part 1107)

The command value outputting part 1107 outputs, as a command value, the calculated value P2($i$) for discharged/charged power of each battery unit 1005 calculated by the discharged/charged power calculator 1104.

(Discharge/Charge Priority Order Giving Part 1110)

Although discharge/charge priority order given by the discharge/charge priority order giving part 1110 may be fixed, it may be switched in a regular manner or switched in a random manner.

Alternatively, priority order for discharge/charge is given in accordance with an index including a factor that indicates a state of the battery unit 1005. The index may include a plurality of factors.

For example, when an SOC is adopted as the factor, the discharge priority order is increased and the charge priority order is decreased with increase in SOC. This leads to preferential discharge of the battery unit 1005 with a larger SOC and preferential charge of the battery unit 1005 with a smaller SOC, and the SOC of the battery unit 1005 is properly held.

When the temperature is adopted as the factor, the discharge priority order is decreased with increase in temperature. In the case of adopting the NaS battery, since an exoergic reaction occurs upon discharge and an endoergic reaction occurs upon charge, the battery unit 1005 with a lower temperature is thus preferentially discharged, and the temperature of the battery unit 1005 is properly held.

When the number of times of discharge/charge is adopted as the factor, the discharge priority order and the charge priority order of the battery unit 1005 with the smaller number of times of discharge/charge are increased. This leads to preferential discharge/charge of the battery unit 1005 with a smaller number of times of discharge/charge, to unify the number of times of discharge/charge of the battery units 1005.

(Limit-Contents Deciding Part 1113)

In a case where a measured value T(j) of a temperature of the cell aggregate 1059, measured by the temperature sensor 1065 and acquired via the temperature controller 1119, is lower than a first lower limit L1, the limit-contents deciding part 1113 permits power supply to the heater 1062 that heats the cell aggregate 1059 even when either discharge or absorption of power has been requested. A similar operation also applies to the case of neither discharge nor absorption of power having been requested, namely, the case of a halt having been requested. Hence, when the necessity to heat the cell aggregate 1059 increases, heating of the cell aggregate 1059 by heater 1062 is permitted. Symbol j included in the measured value T(j) of the temperature specifies the battery module 1053.

Further, when the measured value T(j) of the temperature of the cell aggregate 1059 is higher than the first lower limit L1 and lower than a second lower limit L2, the limit-contents deciding part 1113 permits power supply to the heater 1062 upon request for power absorption, and prohibits power supply to the heater 1062 upon request for power release. Hence, when the necessity for heating of the cell aggregate 1059 slightly decreases, a limit for heating of the secondary battery 102 by the heater 1062 is alleviated more in the case of power absorption having been requested than in the case of power release having been requested These contribute to suppressing the decrease in released power due to supply of power to the heater 1062 and the decrease in absorbed power due to non-supply of power to the heater 1062, and contribute to properly holding the temperature of the cell aggregate 1059.

Further, in a case where the measured value T(j) of the temperature of the cell aggregate 1059 is higher than an upper limit U1, the limit-contents deciding part 1113 prohibits power supply to the heater 1062 that heats the cell aggregate 1059 even when either release or absorption of power has been requested. A similar operation also applies to the case of neither discharge nor absorption of power having been requested, namely, the case of a halt having been requested. Hence, the temperature of the cell aggregate 1059 far exceeding the upper limit U1 is suppressed.

Moreover, the limit-contents deciding part 1113 permits power supply in the order from the heater 1062 with higher supply priority order given by the supply priority order giving part 1116 to the heater 1062 with lower supply priority order given by the same, such that the overall heater power TPS1 is not higher than the requested value |P1| for absorbed power.

When power absorption is requested (P1<0), and it is further desirable to permit power supply to the heater 1062 such that the overall heater power TPS1 is not higher than power −P1−TPS2 obtained by subtracting the overall control power TPS2 from the requested value −P1 for absorbed power, as shown in Equation (5).

$$TPS1 \leq -P1 - TPS2 \qquad (5)$$

Hence, when power absorption is requested, the overall discharged/charged power TP2 of the battery unit 1005 is not positive, thereby to suppress consumption of discharged power of the battery unit 1005 as power supply to the heater 1062. Especially, when the requested value −P1 for absorbed power is small, consumption of discharged power of the battery unit 1005 as supplied power to the heater 1062 is avoided. This contributes to satisfying the request for power absorption while suppressing a power loss that occurs in the battery unit 1005 and the bidirectional converter 1008 in the case of charging/discharging the battery unit 1005.

As described above, when the upper limit −P1−TPS2 of the overall heater power TPS1 is set, power may not be supplied to the heater 1062 even though it is the heater 1062 that heats the cell aggregate 1059 with the measured value T(j) of the temperature being higher than the first lower limit L1 and lower than the second lower limit L2. However, even in such a case, power is supplied to the heater 1062 when the measured value T(j) of the temperature of the cell aggregate 1059 becomes lower than the first lower limit L1 or when the requested value −P1 for absorbed power increases, so that the temperature of the cell aggregate 1059 is held within an appropriate range.

Contents of the limit for power supply, namely, the heater 1062 that permits power supply, are repeatedly updated at intervals.

(Lower Value and Upper Value)

The first lower limit L1 and the upper value U1 are respectively desirably set to values in the vicinity of the upper limit and the lower limit in an operating temperature range of the cell aggregate 1059, and the second lower limit L2 is desirably set to a temperature higher than the first lower limit L1 by 5 to 20° C. When the NaS battery is adopted, the operating temperature range of the cell aggregate 1059 is generally 300 to 360° C.

Although the first lower limit L1, the second lower limit L2, and the upper value U1 may be always constant, it is desirable to displace the first lower limit L1, the second lower limit L2, and the upper value U1, which are applied at the time of an increase in measured value T(j) of the temperature, to higher values than the first lower limit L1, the second lower limit L2, and the upper value U1 which are applied at the time of a decrease in measured value T(j) of the temperature, to perform hysteresis control. This suppresses frequent changes in contents of the limit for power supply, namely, in heater 1062 that permits power supply, thereby to suppress a defect caused by the frequent changes. For example, when power supply to the heater is turned on/off by a mechanical relay, wearing of a contact point of the mechanical relay is suppressed. Further, fluctuations in power are also suppressed.

(Supply Priority Order Giving Part 1116)

The supply priority order to the heater 1062 given by the supply priority order giving part 1116 is increased with decrease in measured value T(j) of the temperature of the cell aggregate 1059 heated by the heater 1062, which is measured by the temperature sensor 1065 and acquired via the battery unit controller 1056. Since the cell aggregate 1059 with a lower temperature is thus preferentially heated, the temperature of the cell aggregate 1059 is properly held.

(Temperature Controller 1119)

The temperature controller 1119 controls power supply to the heater 1062 in accordance with a decision made by the limit-contents deciding part 1113. That is, when power supply to the heater 1062 is permitted by the limit-contents deciding part 1113, the temperature controller 1119 controls power supply to the heater 1062 such that the measured value T(j) of the temperature of the cell aggregate 1059, measured by the temperature sensor 1065 and acquired via the battery unit controller 1056, is a set value. On the other hand, when power supply to the heater 1062 is prohibited by the limit-contents deciding part 1113, the temperature controller 1119 does not supply power to the heater 1062 regardless of the measured value T(j) of the temperature.

The control of power supply to the heater 1062 may be on-off control in which supplied power does not fluctuate during power supply, or may be PI (Proportion Integral) control, PID (Proportion Integral Differential) control in which supplied power fluctuates during power supply, or the like. However, power supply is held constant between updates of contents of a limit for power supply to the heater 1062, and supplied power fluctuates in synchronization with the update of contents of a limit for power supply to the heater 1062 performed by the limit-contents deciding part 1113.

In power supply to the heater 1062, pulse power may be supplied and supplied power may be adjusted by PAM (Pulse Amplitude Modulation) control or PWM (Pulse Width Modulation) control. Further, supplied power may be adjusted by energization time ratio control (duty ratio control).

(Overall Heater Power TPS1)

The overall heater power TPS1 as a basis of calculation of discharged/charged power is measured by a wattmeter 1038. A wattmeter group that measures supplied power PS1(1), PS1(2), ..., PS1(J) to the respective heaters 1062 may be provided, the supplied power PS1(1), PS1(2), ..., PS1(J) to the respective heaters 1062 may be measured by the wattmeter group, and the supplied power PS1(1), PS1(2), ..., PS1(J) to the respective heaters 1062 may then be summed up to obtain the overall heater power TPS1.

When power supply to the heater 1062, supplied power of which does not fluctuate during power supply, is controlled, the supplied power PS1(j) to the heater 1062 is specified upon finding of supply of power to the heater 1062. Accordingly, the discharged/charged power calculator 1104 may acquire, from the temperature controller 1119, a signal indicating that power is being supplied to the heater 1062, and the supplied power PS1(j) to the heater 1062, which is controlled by the temperature controller 1119 having outputted the signal, may be treated as a previously registered value, and the supplied power PS1(j) to the heater 1062, which is controlled by the temperature controller 1119 having outputted no signal, may be treated as 0. In this case, the wattmeter 1038 may be omitted.

Further, the overall heater power TPS1 is specified also from a measured value of released/absorbed power measured by the wattmeter 1032, overall discharged/charged power as a sum of the measured values of respective discharged/charged power of the battery units 1005 which were measured by the wattmeter 1035, and the overall control power TPS2 measured by the wattmeter 1041. In this case as well, the wattmeter 1038 may be omitted.

(Overall Control Power TPS2)

The overall control power TPS2 as a basis for calculation of discharged/charged power is measured by the wattmeter 1041. A wattmeter that measures supplied power to the overall controller 1023 and a wattmeter group that measures supplied power to the respective battery unit controllers 1056 may be provided, supplied power PS2(1) to the overall controller 1023 and supplied power PS2(2), PS2(3), ..., PS2(K) to the respective battery unit controllers 1056 may be measured by the wattmeter group, and the supplied power PS2(1) to the overall controller 1023 and the supplied power PS2(2), PS2(3), ..., PS2(K) to the respective battery unit controllers 1056 may be summed up to obtain the overall control power TPS2.

Further, the overall control power TPS2 is specified also from a measured value of released/absorbed power measured by the wattmeter 1032; overall discharged/charged power TPS as a sum of measured values of discharged/charged power of the respective battery units 1005 which were measured by the wattmeter 1035, and the overall heater power TPS1 measured by the wattmeter 1038. In this case, the wattmeter 1041 may be omitted. In place of measuring the overall heater power TPS1 by means of the wattmeter 1038, it may be specified by another method described above.

(Operation of Power Storage Device 1002)

An operating form of the power storage device 1002 is broadly divided into a pattern operation and a power smoothing operation.

The pattern operation is an operation to perform power release/absorption of power in accordance with fluctuations in power demand of a day. For example, the pattern operation is performed to absorb power in the night time when power demand is small, and release power in the day time when power demand is large. In the case of performing the pattern operation, released/absorbed power per time is often set in advance.

The power smoothing operation is an operation to perform discharge/charge in accordance with fluctuations in power demand in a cycle of several seconds to the order of an hour.

The power storage device 1002 of the first embodiment is suitable for the power smoothing operation. However, making the power storage device 1002 of the first embodiment perform the pattern operation is also permitted.

(Manual Operation of Power Storage Device 1002)

Permission of power supply to the heater 1062 may be manually performed.

In order to allow manual permission of power supply to the heater 1062, the power storage device 1002 makes the heater 1062, which permits power supply decided by the limit-contents deciding part 1113, to be displayed on a display 1029, and an input of the heater 1062, power supply to which is to be actually permitted, is accepted in the operating part 1026. The permission of power supply accepted by the operating part 1026 is transmitted to the temperature controller 1119. It is to be noted that further increasing a manual operation is also permitted.

2. Second Embodiment

A second embodiment relates to a decision of priority for power supply to the heater 1062 in place of the decision of priority for power supply to the heater 1062 in the first embodiment.

In the first embodiment, the supply priority order of the heater 1062 that heats the cell aggregate 1059 is increased with decrease in measured value T(j) of the temperature of the cell aggregate 1059, and power supply is permitted in the order from the heater 1062 with higher supply priority order to the heater 1062 with lower supply priority order. As opposed to this, in the second embodiment, a supply priority class, to which the heater 1062 that heats the cell aggregate 1059 belongs, is raised with decrease in measured value T(j) of the temperature of the cell aggregate 1059, and power supply is permitted in the order from the heater 1062 belonging to a higher supply priority class to the heater 1062 belonging to a lower supply priority class.

FIG. 8 is a block diagram describing a decision of priority for power supply to the heater 1062 in the second embodiment.

As shown in FIG. 8, in the decision of priority for power supply to the heater 1062 in the second embodiment, a supply priority class deciding part 2116 is provided in place of the supply priority order giving part 1116.

The supply priority class deciding part 2116 stratifies a plurality of heaters 1062 and decides a supply priority class to which each of the plurality of heaters 1062 belongs. The supply priority class deciding part 2116 raises the supply priority class with decrease in measured value T(j) of the temperature of the cell aggregate 1059 heated by the heater 1062. The plurality of supply priority classes are divided by a threshold of the measured value T(j) of the temperature. Since the cell aggregate 1059 with a lower temperature is thus preferentially heated, the temperature of the cell aggregate 1059 is properly held. Further, even when the measured value T(j) of the temperature slightly changes, the supply priority class, to which the heater 1062 belongs, often remains unchanged, thereby to suppress frequent changes in heater 1062 permitted to supply power due to a slight change in measured value T(j) of the temperature.

When the supply priority class is given in place of the supply priority order, the limit-contents deciding part 1113 permits power supply in the order from the heater 1062 belonging to a higher supply priority class to the heater 1062 belonging to a lower supply priority class, such that the overall heater power TPS1 is not higher than the requested value −P1 for absorbed power.

However, as in the case of the first embodiment, the overall heater power TPS1 is desirably made not higher than the power −P1−TPS2 also in the second embodiment. Therefore, when power supply to every heater 1062 belonging to one supply priority class is permitted, in the case of the overall heater power TPS1 being higher than the upper limit −P1−TPS2, the limit-contents deciding part 1113 desirably selects the heater 1062 as an object for power supply among the heaters 1062 belonging to one supply priority class such that the overall heater power TPS1 is not higher than −P1−TPS2. The limit-contents deciding part 1113 basically selects the heater 1062 that heats the cell aggregate 1059 with a relatively low measured value T(j) of the temperature, but when the heaters 1062 are different in consumed power, it may select the heater 1062 that consumes small power, although being the heater 1062 that heats the cell aggregate 1059 with a relatively high measured value T(j) of the temperature, so that the overall heater power TPS1 is not higher than −P1−TPS2.

3. Third Embodiment

A third embodiment relates to connection of the controlled power transmission channel 1050 to a system 1092, which is adopted in place of connection of the controlled power transmission channel 1050 to the system 1092 in the first embodiment.

Figure 9:
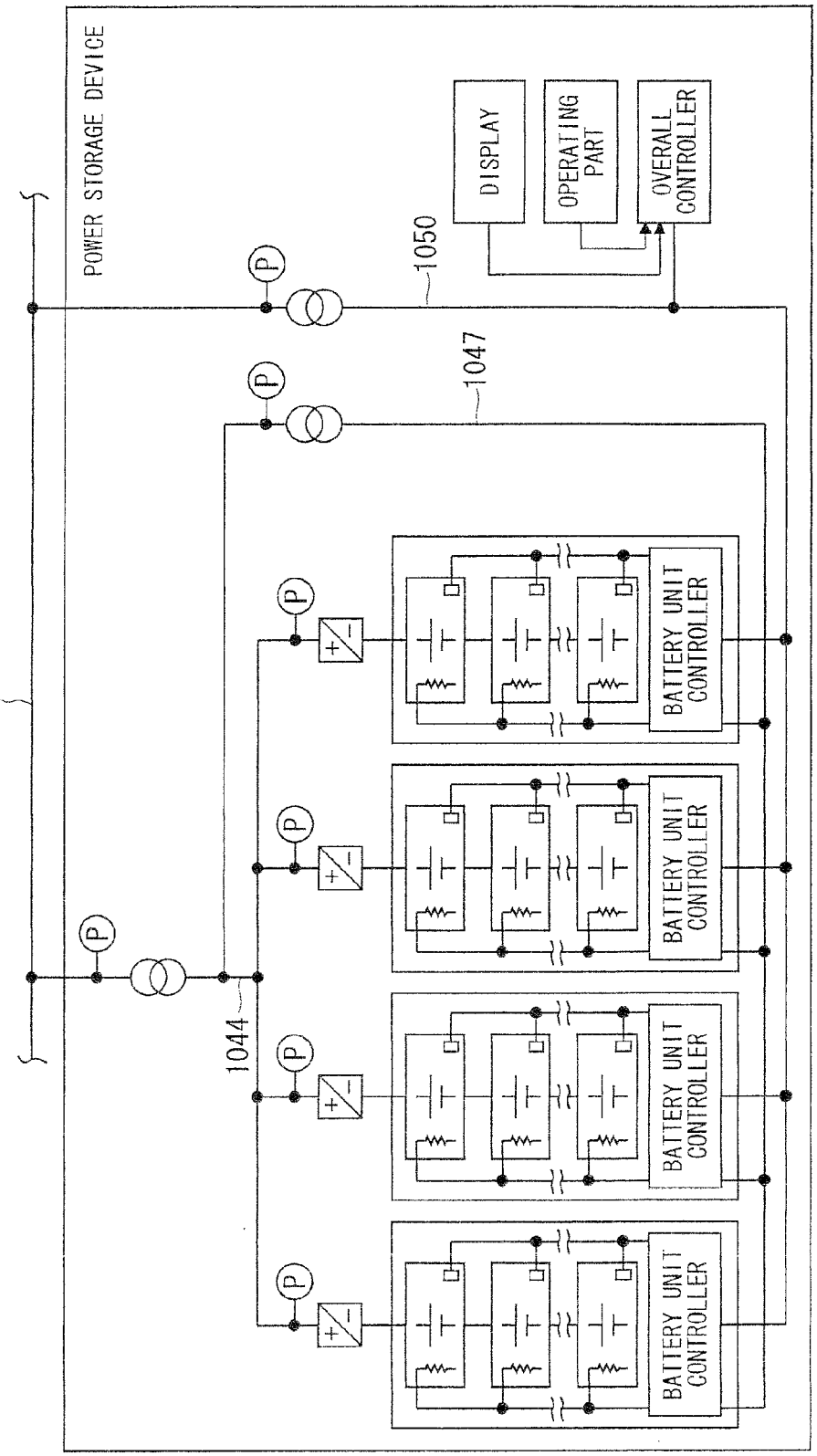
FIG. 9 is a block diagram describing connection to a system of a control power transmission channel in a third embodiment.

In the first embodiment, the controlled power transmission channel 1050 is converged with the discharged/charged power transmission channel 1044 and the heater power transmission channel 1047, and is connected to the system 1092 via the wattmeter 1032. As opposed to this, in the third embodiment, as shown in a block diagram of FIG. 9, the controlled power transmission channel 1050 is not converged with the discharged/charged power transmission channel 1044 and the heater power transmission channel 1047, and is connected to the system 1092 not via the wattmeter 1032.

In this case, in calculation of discharged/charged power, the overall control power TPS2 is not considered, namely, the term of the overall control power TPS2 is deleted from Equation (4). On the other hand, the requested value P1 for released/absorbed power is decided in consideration of the overall control power TPS2.

4. Fourth Embodiment

A fourth embodiment relates to a micro grid 4012 including the power storage device 1002.

Figure 10:
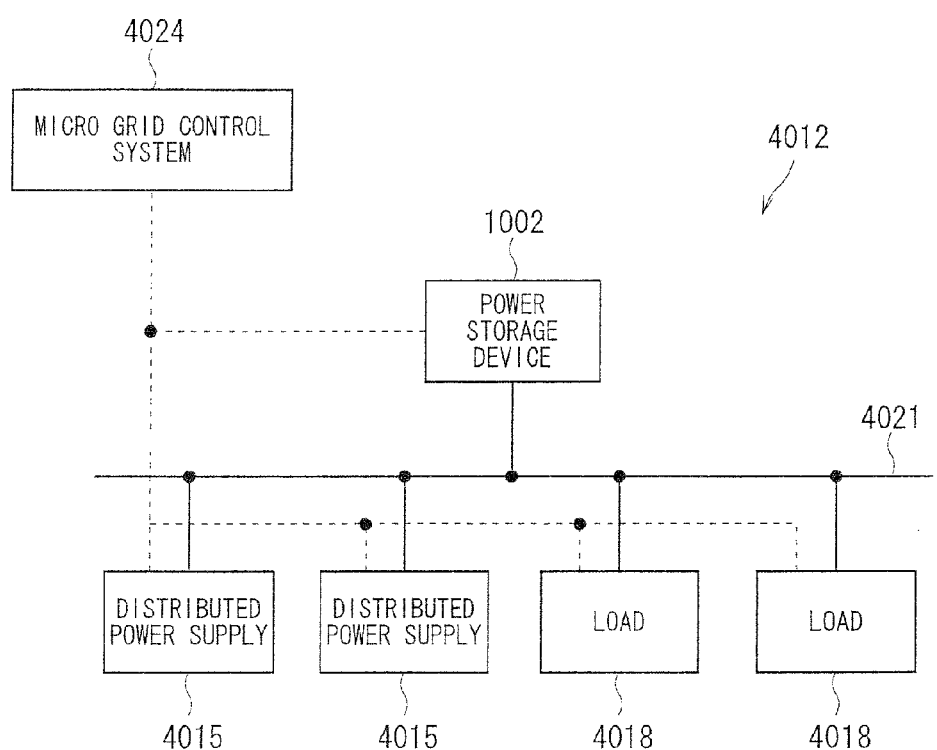
FIG. 10 is a block diagram of a micro grid in a fourth embodiment.

FIG. 10 is a block diagram of a micro grid 4012 in the fourth embodiment. The "micro grid" is a small-sized power supply network installed with a distributed power supply in a power demanded place, and is also called a "distributed energy system" or the like.

As shown in FIG. 2, in the micro grid 4012, a distributed power supply 4015, a load 4018, and the power storage device 1002 are connected to a system 4021. Operations of the distributed power supply 4015, the load 4018, and the power storage device 1002 are controlled by a micro grid control system 4024, and the request for power release/absorption and the requested value P1 for discharged/supplied power are transmitted from the micro grid control system 4024 to the power storage device 1002.

The distributed power supply 4015 is not particularly limited, but for example, an electric generator that utilizes sun light or other natural energy, such as a solar power generation device, is used. A fuel cell or the like which uses a gas, manufactured using a raw material such as raw garbage, waste wood, or waste plastic, as a fuel may be employed as the distributed power supply 4015.

Part or the whole of power generated by the distributed power supply 4015 is transmitted to a power storage device 1002 via the system 4021, and stored into the power storage device 1002. The power storage device 1002 may be used for adjustment of power demand inside the micro grid 4012. In this case, since the power smoothing operation is operated in which the request for charge/discharge is frequently switched, the control described in the first embodiment and the second embodiment is preferably adopted.

5. Fifth Embodiment

A fifth embodiment relates to a decision of a limit for power supply to the heater 1062 in place of the decision of the limit for power supply to the heater 1062 in the first embodiment.

In the first embodiment, contents of the limit for power supply to the heater 1062 is decided based on the measured value T(j) of the temperature of the cell aggregate 1059 in the first embodiment, but in the fifth embodiment, contents of the limit for power supply to the heater 1062 is decided based on a predicted value Tp(j) of a future temperature of the cell aggregate 1059.

Figure 11:
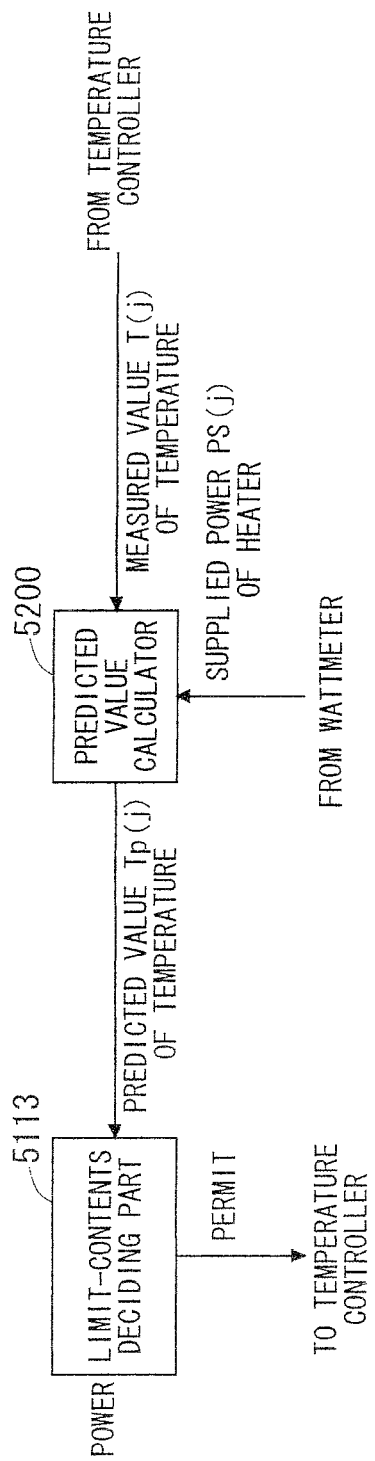
FIG. 11 is a block diagram describing a decision of contents of a limit for power supply to the heater in a fifth embodiment.

FIG. 11 is a block diagram describing a decision of contents of a limit for power supply to the heater 1062 in the fifth embodiment.

As shown in FIG. 11, in the decision of contents of the limit for power supply to the heater 1062 in the fifth embodiment, a limit-contents deciding part 5113 is provided in place of the limit-contents deciding part 1113. Further, a predicted value calculator 5200 that calculates the predicted value Tp(j) of the temperature of the cell aggregate 1059 is further provided.

The predicted value calculator 5200 calculates the predicted value Tp(j) of the temperature of the cell aggregate 1059 from a history of the measured value T(j) of the temperature of the cell aggregate 1059, having been measured by the temperature sensor 1065 and acquired via the temperature controller 1119, and a history of supplied power PS(j) to the heater 1062.

When the predicted value Tp(j) of the temperature of the cell aggregate 1059, having been calculated by the predicted value calculator 5200, is lower than a second lower limit L2, the limit-contents deciding part 5113 permits power supply to the heater 1062 that heats the cell aggregate 1059 upon request for power absorption, and prohibits power supply to the heater 1062 that heats the cell aggregate 1059 upon request for power release.

Further, in a case where the predicted value Tp(j) of the temperature of the cell aggregate 1059, having been calculated by the predicted value calculator 5200, is higher than the upper limit U1, the limit-contents deciding part 5113 prohibits power supply to the heater 1062 that heats the cell aggregate 1059 even when either release or absorption of power has been requested. A similar operation also applies to the case of neither discharge nor absorption of power having been requested, namely, the case of a halt having been requested. Hence, the temperature of the cell aggregate far exceeding the upper limit U1 is suppressed.

Deciding the contents of the limit for power supply to the heater 1062 in the fifth embodiment is preferred when the heat capacity of the cell aggregate 1059 is large. This is because, in the case of the large heat capacity of the cell aggregate 1059, a displacement of the temperature of the cell aggregate 1059 from the set value is smaller when the contents of the limit for power supply to the heater 1062 is decided based on the predicted value Tp(j) of the temperature of the cell aggregate 1059 than when it is decided based on measured value T(j) of the temperature of the cell aggregate 1059.

Although the second lower limit L2 and the upper value U1 may be always constant, it is desirable to displace the second lower limit L2 and the upper value U1, which are applied at the time of an increase in predicted value Tp(j) of the temperature, to higher values than the second lower limit L2 and the upper value U1, which are applied at the time of a decrease in predicted value Tp(j) of the temperature, and perform hysteresis control.

6. Others

Although the present invention has been described in detail, the foregoing descriptions are illustrative in all aspects, and the invention is not limited to the foregoing descriptions. Countless modified examples, which are not shown, can be assumed without deviating from the scope of the invention. In particular, the described items are naturally designed to be combined.

The invention claimed is:

1. A control apparatus for a secondary battery, comprising:
a request acquiring part that acquires a request for power release/absorption and a requested value for released/absorbed power;
a discharged/charged power calculator that calculates discharged/charged power of said secondary battery;
a command value outputting part that outputs a calculated value of the discharged/charged power calculated by said discharged/charged power calculator as a command value for discharged/charged power;
a bidirectional converter that controls discharge/charge of said secondary battery such that the discharged/charged power is the command value outputted by said command value outputting part;
a power consuming body that consumes power;
a limit-contents deciding part that decides contents of a limit for power supply to said power consuming body; and
a supply controller that controls power supply to said power consuming body in accordance with the decision made by said limit-contents deciding part, wherein
said limit-contents deciding part sets the limit for power supply relatively higher when a request for power release is acquired by said request acquiring part, and sets the limit for power supply relatively lower when a request for power absorption is acquired by said request acquiring part.

2. The control apparatus for a secondary battery according to claim 1, wherein
said discharged/charged power calculator adds the power supplied to said power consuming body to the requested value for released power acquired by said request acquiring part, to calculate discharged power, and subtracts the power supplied to said power consuming body from the requested value for absorbed power acquired by said request acquiring part, to calculate charged power.

3. The control apparatus for a secondary battery according to claim 1, wherein
said power consuming body is a heater that heats said secondary battery,
a temperature sensor that measures a temperature of said secondary battery is further provided in said control apparatus for a secondary battery, and
said limit-contents deciding part permits power supply to said heater regardless of the request acquired by said request acquiring part when the measured value of the temperature measured by said temperature sensor is lower than a first lower limit, permits power supply to said heater upon acquirement of the request for power absorption by said request acquiring part and prohibits power supply to said heater upon acquirement of the request for power release by said request acquiring part when the measured value of the temperature measured by said temperature sensor is higher than the first lower limit and lower than a second lower limit.

4. The control apparatus for a secondary battery according to claim 3, wherein said supply controller controls power supply to said heater such that the measured value of the temperature measured by said temperature sensor is a set value when power supply to said heater is permitted by said limit-contents deciding part.

5. The control apparatus for a secondary battery according to claim 3, wherein
a plurality of said temperature sensors and said heaters are provided,
a priority deciding part that decides priority for power supply to each of said plurality of heaters is further provided in said control apparatus for a secondary battery,
said priority deciding part increases priority for power supply to the heater with decrease in measured value of the temperature measured by said temperature sensor, and
said limit-contents deciding part permits power supply in an order from said heater with higher priority for power supply to said heater with lower priority for power supply, the priority having been decided by said priority deciding part, such that overall supplied power, as a sum of power supplied to each of said plurality of heaters, is not higher than the requested value for absorbed power acquired by said request acquiring part.

6. The control apparatus for a secondary battery according to claim 3, wherein
said limit-contents deciding part repeatedly updates contents of a limit for power supply to said power consuming body at intervals, and
a first lower limit and a second lower limit which are applied at the time of an increase in measured value of the temperature measured by said temperature sensor are displaced to higher values than a first lower limit and a second lower limit which are applied at the time of a decrease in measured value.

7. The control apparatus for a secondary battery according to claim 3, wherein said limit-contents deciding part prohibits power supply to said heater regardless of the request acquired by said request acquiring part when the measured value of the temperature measured by said temperature sensor is higher than an upper limit.

8. The control apparatus for a secondary battery according to claim 1, wherein
said power consuming body is a heater that heats said secondary battery,
a temperature sensor that measures a temperature of said secondary battery and a predicted value calculator that calculates a predicted value of the temperature of said secondary battery from a history of the measured value of the temperature measured by said temperature sensor and a history of the supplied power to said power consuming body are further provided in said control apparatus for a secondary battery, and
said limit-contents deciding part permits power supply to said heater upon acquirement of the request for power absorption by said request acquiring part and prohibits power supply to said heater upon acquirement of the request for power release by said request acquiring part when the predicted value of the temperature calculated by said predicted value calculator is lower than a lower limit.

9. The control apparatus for a secondary battery according to claim 8, wherein said supply controller controls power supply to said heater such that the measured value of the temperature measured by said temperature sensor is a set value when power supply to said heater is permitted by said limit-contents deciding part.

10. The control apparatus for a secondary battery according to claim 8, wherein
a plurality of said temperature sensors and said heaters are provided,
a priority deciding part that decides priority for power supply to each of said plurality of heaters is further provided in said control apparatus for a secondary battery,
said priority deciding part increases priority for power supply to the heater with decrease in measured value of the temperature measured by said temperature sensor, and
said limit-contents deciding part permits power supply in an order from said heater with higher priority for power supply to said heater with lower priority for power supply, the priority having been decided by said priority deciding part, such that overall supplied power, as a sum of power supplied to each of said plurality of heaters, is not higher than the requested value for absorbed power acquired by said request acquiring part.

11. The control apparatus for a secondary battery according to claim 8, wherein
said limit-contents deciding part repeatedly updates contents of a limit for power supply to said power consuming body at intervals, and
a lower limit which is applied at the time of an increase in predicted value of the temperature calculated by said predicted value calculator is displaced to a higher value than a lower limit which is applied at the time of a decrease in predicted value.

12. The control apparatus for a secondary battery according to claim 8, wherein said limit-contents deciding part prohibits power supply to said heater regardless of the request acquired by said request acquiring part when the predicted value of the temperature calculated by said predicted value calculator is higher than an upper limit.

13. A control method for a secondary battery, comprising:
(a) a step of acquiring a request for power release/absorption and a requested value for released/absorbed power;
(b) a step of calculating discharged/charged power of said secondary battery;

(c) a step of outputting a calculated value of the discharged/charged power calculated in said step (b) as a command value for discharged/charged power;

(d) a step of controlling discharge/charge of said secondary battery such that the discharged/charged power is the command value outputted in said step (c);

(e) a step of deciding contents of a limit for power supply to the power consuming body; and (f) a step of controlling power supply to said power consuming body in accordance with the decision made in said step (e), wherein said step (e) sets the limit for power supply relatively higher when a request for power release is acquired in said step (a), and sets the limit for power supply relatively lower when a request for power absorption is acquired in said step (a).

14. A control method for a secondary battery according to claim 13, wherein said step (b) adds the power supplied to said power consuming body to the requested value for released power acquired in said step (a), to calculate discharged power, and subtracts the power supplied to said power consuming body from the requested value for absorbed power acquired in said step (a), to calculate charged power.

* * * * *